(12) United States Patent
van der Molen

(10) Patent No.: US 6,347,774 B1
(45) Date of Patent: Feb. 19, 2002

(54) CLIP FOR FIXING A PART ON A BAR AND DOCUMENT FEEDER COMPRISING AT LEAST ONE SUCH CLIP

(75) Inventor: Michiel Post van der Molen, Amsterdam (NL)

(73) Assignee: Buhrs-Zaandam B.V., Zaandam (NL)

( * ) Notice: Subject to any disclaimer, the term of this patent is extended or adjusted under 35 U.S.C. 154(b) by 0 days.

(21) Appl. No.: 09/572,597

(22) Filed: May 17, 2000

(30) Foreign Application Priority Data

May 17, 1999 (NL) ............................................. 1012069

(51) Int. Cl.⁷ ............................... F16B 2/02; F16B 2/22
(52) U.S. Cl. ............................. 248/231.71; 248/231.81
(58) Field of Search ............................... 248/214, 228.3, 248/228.4, 228.6, 228.7, 231.41, 231.51, 231.71, 231.81, 316.4, 316.5, 316.7, 316.1

(56) References Cited

U.S. PATENT DOCUMENTS

| 2,353,365 A | * | 7/1944 | Sanford | 248/316.7 |
| 4,901,969 A | * | 2/1990 | Yaeger | 248/455 |
| 5,618,015 A | * | 4/1997 | Morini | 248/74.2 |
| 5,765,787 A | * | 6/1998 | de Beers et al. | 248/73 |

FOREIGN PATENT DOCUMENTS

| DE | 1675011 | | 12/1970 |
| EP | 0061257 | A1 | 9/1982 |
| FR | 2518194 | | 6/1983 |
| GB | 963699 | | 7/1964 |

* cited by examiner

Primary Examiner—Anita King
Assistant Examiner—Jon Szumny

(57) ABSTRACT

A clip for fixing a part on a bar, said clip comprising a first clip part which is substantially form-retaining and comprises a bracket slidable along the bar, a bracket arm being connected to the bracket, the clip comprising a second clip part having a flexible spring arm whose first end is connected to a free end of the bracket arm remote from the bracket, the spring arm having such a length that in a clamping position, it is subjected to pressure and whose second end presses against the bar, so that the bracket is not slidable along the bar, while the spring arm can be bent by means of an operating lever, so that the bracket is slidable along the bar.

8 Claims, 1 Drawing Sheet

CLIP FOR FIXING A PART ON A BAR AND DOCUMENT FEEDER COMPRISING AT LEAST ONE SUCH CLIP

BACKGROUND OF THE INVENTION

The invention relates to a clip for fixing a part on a bar. For a large number of apparatus, it is necessary that parts be temporarily fixed and positioned on a bar. For this purpose, clips are often used which comprise a bracket with a wing bolt or set bolt. The bracket extends at least partially around the bar and by means of the wing bolt or set bolt. the bar can be pressed on in the bracket. When the clip is to be displaced relative to the bar, the set bolt or wing bolt should be loosened, so that the bracket becomes slidable relative to the bar. When the desired position of the bracket relative to the bar has been reached, the wing bolt or set bolt can be tightened again for fixing the bracket relative to the bar. In particular in the case of apparatus comprising a large number of parts which each have to be positioned in a specific position, utilization of the known clip is very time-consuming. For instance, applicant markets a document feeder which forms part of a packaging line, where no fewer than 30 parts should be set in the above-described manner whenever a new type of document is to be processed with the document feeder. In respect of such parts to be set, one may think of nozzles, leaf springs, document guides and the like.

SUMMARY OF THE INVENTION

The object of the invention is to provide a clip by means of which the clamping force can be removed by a simple manipulation, allowing the clip to be shifted relative to the bar and by means of which the clamping force can be re-established just as easily, so that the clip assumes a fixed position relative to the bar.

To this end, the invention provides a clip comprising a first clip part which is substantially form-retaining and comprises a bracket whose inner profile connects around a portion of the circumference of the bar, such that the bracket is slidable along the bar, the bracket having a passage at the location of which the bracket leaves a part of the circumference of the bar clear, a bracket arm being connected to the bracket, the clip comprising a second clip part having a flexible spring arm whose first end is connected to a free end of the bracket arm remote from the bracket, the spring arm having such a length that in a clamping position, it is subjected to pressure and whose second end presses against the portion of the bar that is left clear by the passage, so that the bar is pressed into the bracket and the bracket is hardly, if at all, slidable along the bar, the spring arm having an operating lever connected thereto, such that by means of the operating lever, the spring arm can be bent, so that it shortens and the pressure force exerted on the bar by the spring arm decreases, so that the bracket is slidable along the bar.

Since the spring arm is subjected to compression, a considerable clamping force can be realized, while only a very slight bending of the spring arm is necessary for removing the clamping force completely, In practice, the machine operator needs to press the operating lever only slightly towards the bracket arm, basically in the manner in which a clothes peg can be opened, so that the spring arm bends. The operating force to be exerted on the operating lever for bending the spring arm is relatively slight, because the clamping force is overcome in an efficient manner due to the lever action of the operating lever.

The invention also relates to a document feeder comprising at least one clip according to the invention.

Further elaborations of the invention are described in the subclaims and will hereinafter be specified with reference to the many accompanying drawing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
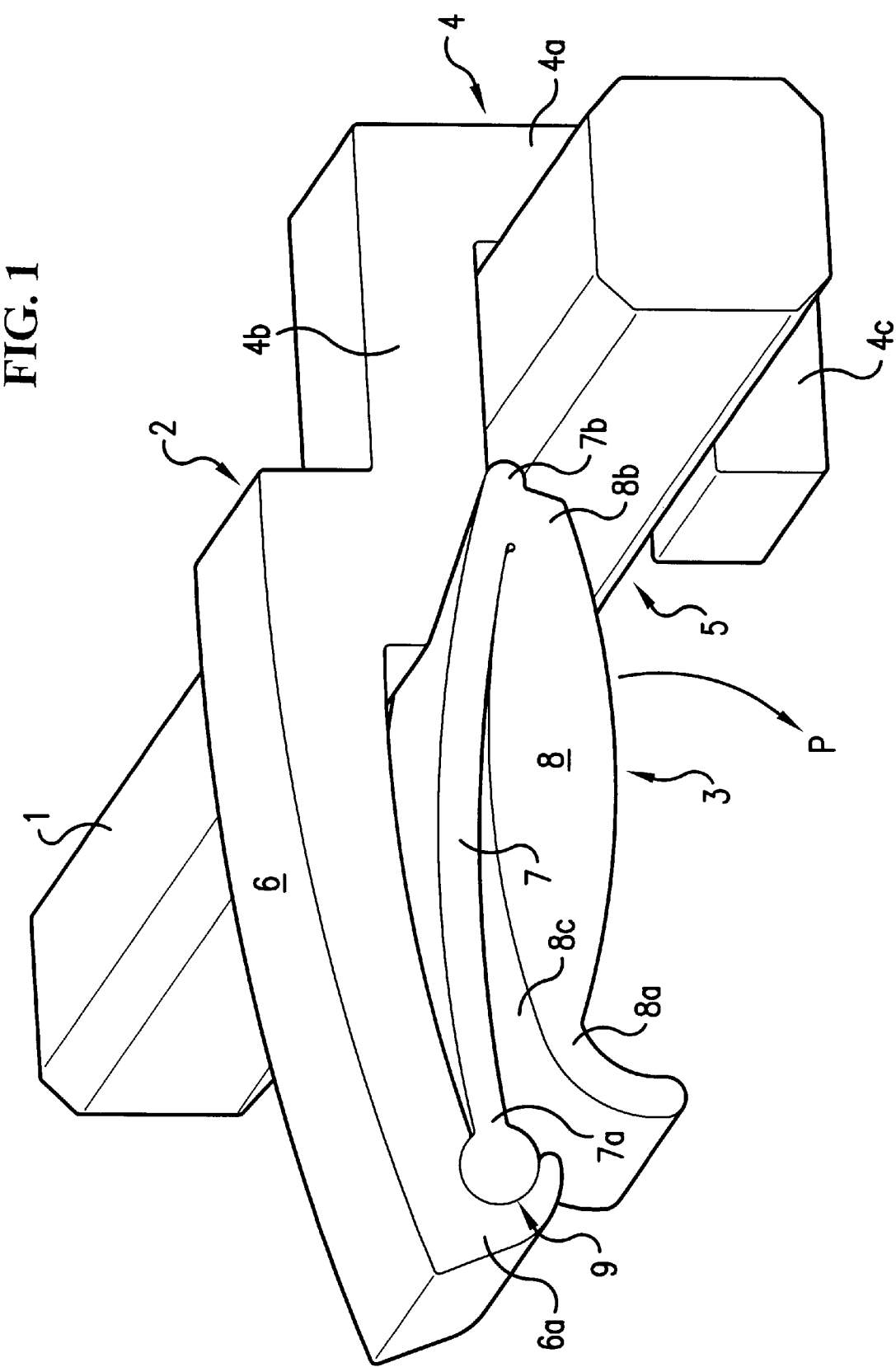
FIG. 1 is a perspective view of a clip according to the present invention.

The drawing shows an exemplary embodiment of a clip according to the invention. The clip, intended for fixing a part on a bar 1, comprises a first clip part 2 which is substantially form-retaining and a second clip part 3. The first clip part 2 is form-retaining in that it is manufactured from a rigid material. For this, aluminum, steel or fiber-reinforced rigid plastics can be considered. The first clip part 2 comprises a bracket 4 whose inner profile connects around a portion of the circumference of the bar 1, such that the bracket 4 is slidable along the bar 1. The bracket 4 has a passage 5 at the location of which the bracket 4 leaves a portion of the circumference of the bar 1 clear. In the present exemplary embodiment, the bar 1 is substantially rectangular and the bracket 4 is U-shaped and comprises a body 4a and two legs 4b, 4c. Connected to leg 4b of the bracket 4 is a bracket arm 6. The bracket 4 and the bracket arm 6 together constitute the first clip part 2 and are in the present exemplary embodiment designed as an integral, single part. The clip further has a second clip part 3 comprising a flexible spring arm 7. The flexible spring, arm 7 has its first end 7a connected to a free end 6a of the bracket arm 6 remote from the U-shaped bracket. The spring arm 7 has such a length that in a clamping position, it is subjected to pressure and abuts by its second end 7b against the portion of the bar 1 which portion is left clear by the passage 5. This involves the pressure force exerted by the spring arm 7 being such that the bracket 4 is not slidable along the bar 1. The second clip part 3 further comprises an operating lever 8 which, in the present exemplary embodiment, is connected to the spring arm 7 adjacent the second end 7b, such that by means of the operating lever 8, the spring arm 7 can be bent, as a result of which it shortens and the pressure force exerted by the spring arm 7 on the bar decreases, so that the bracket 4 is slidable along the bar 1.

In the present exemplary embodiment, the connection between the bracket arm 6 and the spring arm 7 is a hinged connection 9. Hence, when the spring arm 7 has been brought into the bent condition by means of the operating lever 8, the second clip part 3 can be pivoted relative to the bracket arm 6 around the hinged connection 9 in the direction of the arrow P. Thus, the passage 5 is released completely, enabling removal of the clip from the bar 1.

In the present exemplary embodiment, the connection between the operating lever 8 and the spring arm 7 is a rigid connection, such that an angular displacement of the operating lever part 8b adjacent the second end 7b of the spring arm 7 results in a substantially corresponding angular displacement of the second end 7b of the spring arm 7. In that manner, the rigid connection promotes the bending of the spring arm 7. For further promotion of the bending of the spring arm 7 with minimal operating force, the side of the operating lever 8 facing the spring arm 7 is provided with a convex surface 8c having such a shape that it guides the bending of the spring arm 7, so that a required shortening of the spring arm 7 is effected with a minimum operating force. Preferably, as shown in the present exemplary embodiment, the convex surface 8c is formed by a continuous curve whose curvature is smaller than or equal to the curvature to be adopted by the spring arm 7 in order to be brought from the clamping condition into a release condition in which the clip is slidable along the bar 1.

The bar 1 can, for instance, be fixedly connected to a document feeder for a packaging line. A part which is to be positioned relative to the bar 1, such as, for instance, a nozzle, a leaf spring, a document lateral guide or a like part, is connected to the clip, in particular to the first clip part 2, such that through positioning of the clip, the relevant part can likewise be brought into a desired position.

It may be understood that the invention is not limited to the exemplary embodiment described, but that various modifications are possible within the framework of the invention. Thus, the bar may, for instance, have a triangular, round, ellipsoidal or like shape instead of a rectangular cross section, in which case the shape of the bracket 4 should of course be accommodated to the sectional profile of the bar 1. It is essential that with the clip according to the invention, a part connected to the clip can be positioned on a bar in a fast manner, while the clamping force of the clip is considerable and the force to be exerted by the machine operator for removing this clamping force is slight and, moreover, the operations to be performed for removing the clamping force are minimal.

What is claimed is:

1. A clip for fixing a part on a bar, said clip comprising: a first clip part, said first clip part being substantially form-retaining and comprising:
a bracket, said bracket having an inner profile connecting around a portion of a circumference of the bar, such that said bracket is slidable along the bar, said bracket having a passage where said bracket leaves a portion of the circumference of the bar clear; and
a bracket arm, said bracket arm being connected to said bracket; and a second clip part, said second clip part comprising a flexible spring arm, said flexible spring arm having a first end connected to a free end of said bracket arm remote from said bracket, said spring arm having a length such that in a clamping position, said spring arm is subjected to pressure, said spring arm having a second end that presses against a portion of the bar that is left clear by said passage, so that the bar is pressed into said bracket and said bracket is hardly, if at all, slidable along the bar, said spring arm having an operating lever connected thereto, such that by means of said operating lever, said spring arm is bendable, so that said spring arm shortens and the pressure force exerted on the bar by said spring arm decreases, so that said bracket is slidable along the bar.

2. The clip according to claim 1, wherein the connection between said bracket arm and said spring arm is a hinged connection, so that when said spring arm has been brought into the bent condition by means of said operating lever, said second clip part is pivotable relative to said bracket arm.

3. The clip according to claim 1 or 2, wherein the connection between said operating lever and said spring arm is formed adjacent said second end of said spring arm and said connection is a rigid connection, such that an angular displacement of an operating lever part of said operating lever adjacent said second end of said spring arm results in a substantially corresponding angular displacement of said second end of said spring arm.

4. The clip according to claim 1, wherein on a side facing said spring arm, said operating lever is provided with a convex surface having a shape that said convex surface guides the bending of said spring arm, so that a required shortening of said spring arm is effected with minimum operating force.

5. The clip according to claim 4, wherein said convex surface is formed by a continuous curve having a curvature smaller than or equal to the curvature to be adopted by spring arm in order to be brought from the clamping condition into a release condition in which said clip is slidable along the bar.

6. The clip according to claim 1, wherein the bar is substantially rectangular, said bracket is U-shaped and comprises a body and two legs, and said bracket arm is connected to one of said legs.

7. The clip according to claim 1, wherein said first clip part is manufactured from metal, and said second clip part is manufactured from plastic.

8. A document feeder comprising at least one clip according to claim 1.

* * * * *